United States Patent [19]

Emery

[11] Patent Number: 5,893,330
[45] Date of Patent: Apr. 13, 1999

[54] SUSPENSION APPARATUS

[75] Inventor: Benjamin H. Emery, Pittsburgh, Pa.

[73] Assignee: Emery Properties, Inc., Wilmington, Del.

[21] Appl. No.: 08/890,868

[22] Filed: Jul. 10, 1997

[51] Int. Cl.⁶ .................................................. B61F 13/00
[52] U.S. Cl. ........................ 105/224.05; 105/453; 267/4; 180/124.179
[58] Field of Search ............... 105/224.05, 224.06, 105/224.1, 453; 267/4, 103, 111, 100, 249; 280/124.127, 124.179, 86.1; 16/44

[56] References Cited

U.S. PATENT DOCUMENTS

| | | | |
|---|---|---|---|
| 319,973 | 6/1885 | Gray | 105/224.05 |
| 972,058 | 10/1910 | Chisholm | 56/230 |
| 1,816,393 | 7/1931 | Morris | 280/124.179 |
| 1,869,123 | 7/1932 | Walters | 56/232 |
| 2,347,987 | 5/1944 | Brumbaugh | 280/124.179 |
| 2,503,333 | 4/1950 | Gyles | 280/124.179 |
| 2,786,320 | 3/1957 | Larson | 56/10.4 |
| 2,816,776 | 12/1957 | Nimtz | 280/124.179 |
| 3,173,670 | 3/1965 | Hornsby | 280/124.127 |
| 3,211,468 | 10/1965 | Flowers | 280/124.179 |
| 4,166,420 | 9/1979 | Pleger et al. | 105/224.05 |
| 4,220,352 | 9/1980 | Umeda et al. | 280/124.127 |
| 4,315,396 | 2/1982 | Oka et al. | 56/320.1 |
| 4,384,443 | 5/1983 | Hoogstrate | 56/11.9 |
| 4,713,898 | 12/1987 | Bull et al. | 37/96 |
| 4,996,830 | 3/1991 | Davison | 36/14.7 |
| 5,174,098 | 12/1992 | Emery | 56/10.7 |
| 5,341,629 | 8/1994 | Penner | 56/15.2 |
| 5,375,398 | 12/1994 | McClymonds | 56/15.2 |
| 5,392,593 | 2/1995 | Emery | 56/15.2 |

Primary Examiner—Mark T. Le
Attorney, Agent, or Firm—Kirkpatrick & Lockhart LLP

[57] ABSTRACT

Suspension apparatus for a mobile vehicle having a frame and a plurality of wheel units adapted to travel on rails. In a preferred form, the apparatus includes a housing member that is rigidly attached to the frame and corresponds to a wheel unit. The housing member has an enclosed end and a downwardly-extending open end. The apparatus further includes a wheel unit support assembly, a portion of which is telescopingly received within the housing member. The wheel unit support assembly is adapted for attachment to a wheel unit and is biased out of the housing member by a spring. A travel-limiting pin arrangement is provided to limit the axial travel of the wheel unit support assembly relative to the housing member to a predetermined range of axial travel.

20 Claims, 6 Drawing Sheets

SUSPENSION APPARATUS

CROSS REFERENCE TO RELATED APPLICATIONS

Not Applicable.

FEDERALLY SPONSORED RESEARCH

Not Applicable.

BACKGROUND OF THE INVENTION

1. Field of the Invention

The present invention relates to track-mounted vehicles and, more particularly, is directed to suspension apparatus for vehicles that are adapted to travel on rails.

2. Description of the Invention Background

According to the American Railroad Association, there are approximately 173,000 miles of actively used railroad tracks in the United States. In addition to locomotives and the haulage cars that they tow, a variety of other vehicles have been developed for riding the rails to perform various maintenance and inspection functions. For example, mobile vehicles have been developed to ride along the tracks and cut brush and vegetation adjoining the railroad right of ways. Examples of such vehicles are disclosed in U.S. Pat. No. 5,392,593 entitled Mobile Apparatus for Cutting Vegetation and pending U.S. patent application Ser. No. 08/615,418, filed Mar. 14, 1996, entitled Vegetation Cutting Apparatus, the disclosures of which are herein incorporated by reference.

Track-mounted vehicles of the type described above and other track-mounted vehicles can, at times, experience derailment when the vehicle contacts a switching mechanism which serves to direct the vehicle onto another set of adjoining rails. For example, some switches, due to their design or location, can cause the rear set of wheels to derail from the track as the vehicle traverses the switch. Such derailment can cause that section of track to be closed for longer than normal maintenance periods. In addition, such derailments can cause injury to personnel and damage the tracks and the vehicle itself.

While sophisticated suspension systems have been developed over the years for various vehicles, such systems are often expensive to install and maintain making them illsuited for use with some track-mounted vehicles. Thus, there is a need for a suspension system for a track-mounted vehicle that is relatively inexpensive to install and maintain.

SUMMARY OF THE INVENTION

In accordance with a preferred form of the present invention, there is provided a suspension apparatus for a mobile vehicle that has a frame and a plurality of wheel units adapted for travel on corresponding rails. The apparatus preferably includes a housing member that corresponds to a wheel unit and is rigidly attached to the frame. The housing member has an enclosed end and a downwardly-extending open end and serves to define an extension axis. A preferred apparatus also includes a wheel unit support assembly that has a first attachment plate for attachment to the wheel unit and an upwardly extending hollow extension portion that is attached to the first attachment plate and sized to be telescopingly received in is the housing member along the extension axis. A biasing member is received in the hollow extension portion and extends between the enclosed end of the housing member and the first attachment plate to bias the first attachment plate away from the frame. A preferred form of the apparatus includes a travel limiting assembly that is accessible from the exterior of the frame and cooperates with the hollow extension portion to selectively limit the axial travel of the hollow extension portion relative to the housing member to a predetermined range of axial travel.

It is an object of the present invention to provide a suspension apparatus for a mobile vehicle adapted to run on tracks that is relatively inexpensive to manufacture, install and maintain.

Accordingly, the present invention provides solutions to the aforementioned problems associated with track-mounted mobile vehicles. The reader will appreciate that, in addition to the aforementioned details and objects, advantages associated with the use of the present invention will become apparent as the following detailed description of present preferred embodiments thereof proceeds.

BRIEF DESCRIPTION OF THE DRAWINGS

In the accompanying drawings, there are shown present preferred embodiments of the invention wherein like reference numerals are employed to designate like parts and wherein.

DETAILED DESCRIPTION OF PREFERRED EMBODIMENTS

Figure 1:
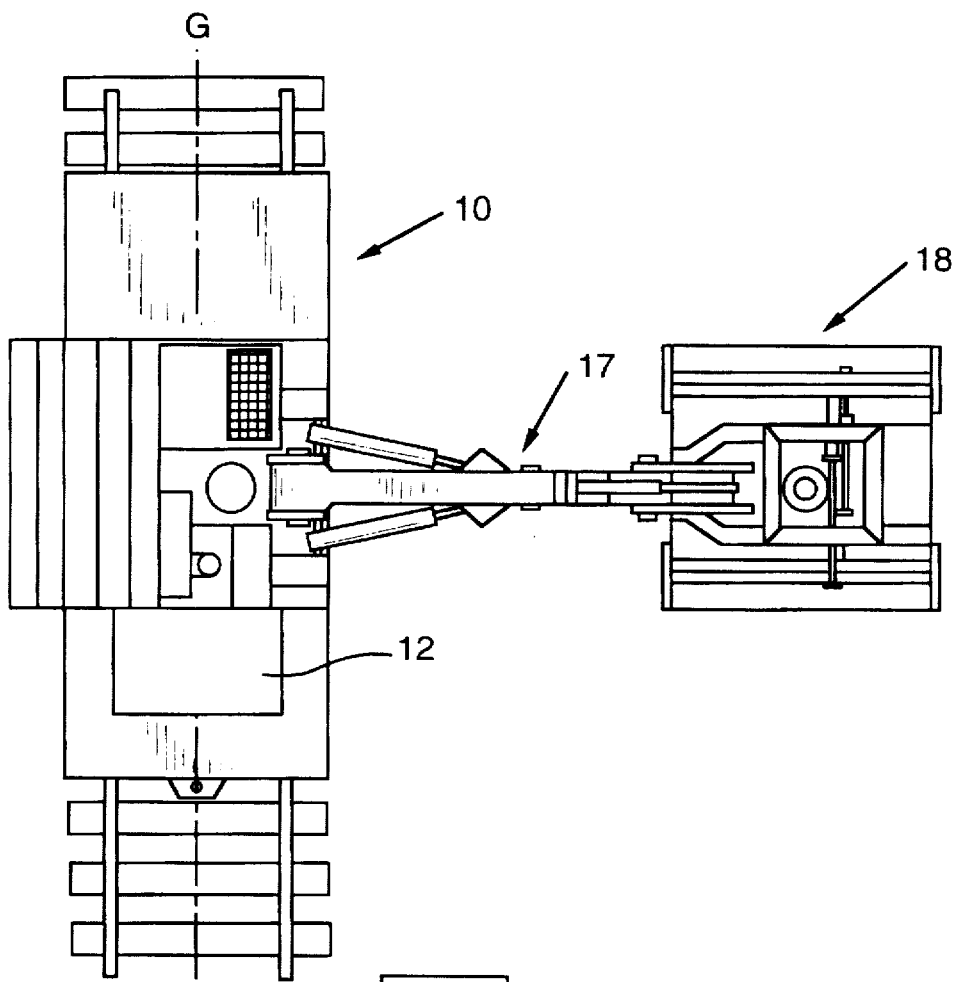
FIG. 1 is a preferred track-mounted mobile vehicle that employs the preferred suspension system of the subject invention.

Referring now to the drawings for the purposes of illustrating present preferred embodiments of the invention only and not for purposes of limiting the same, the Figures show a mobile vehicle 10 that is adapted for travel on railroad tracks. For the purposes of this description, the mobile vehicle 10 comprises a self-propelled vegetation cutting apparatus of the type disclosed in pending U.S. patent application Ser. No. 08/615,418 now abandoned, the disclosure of which was herein incorporated by reference. The skilled artisan will appreciate, however, that the subject invention could be successfully employed with other track-mounted vehicles. Thus, the suspension apparatus of the present invention should not be limited to track-mounted vehicles equipped with vegetation cutting apparatuses.

Figure 2:
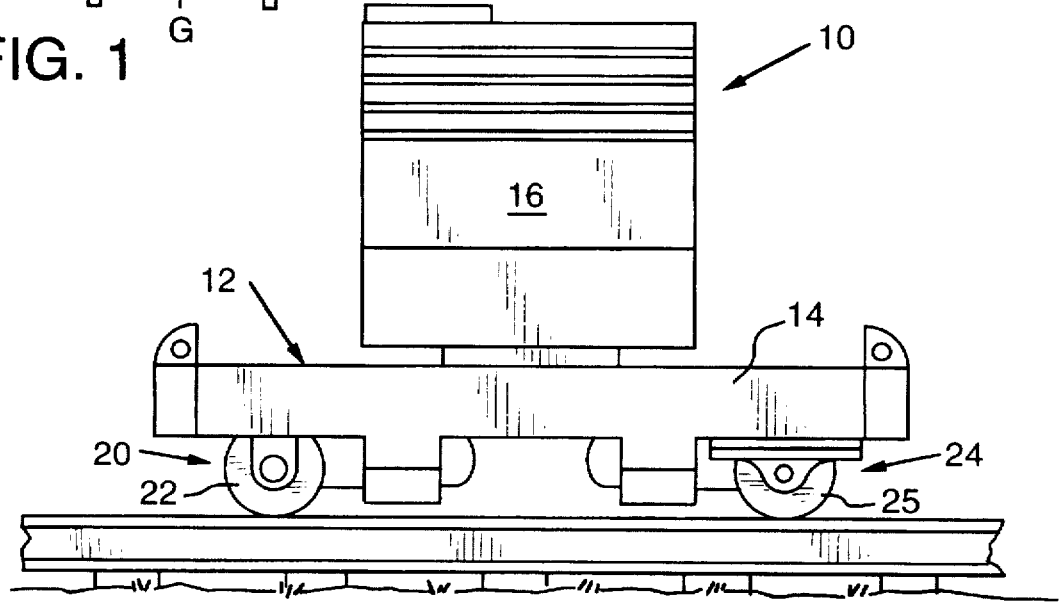
FIG. 2 is a side elevational view of the vehicle of FIG. 1.
Figure 3:
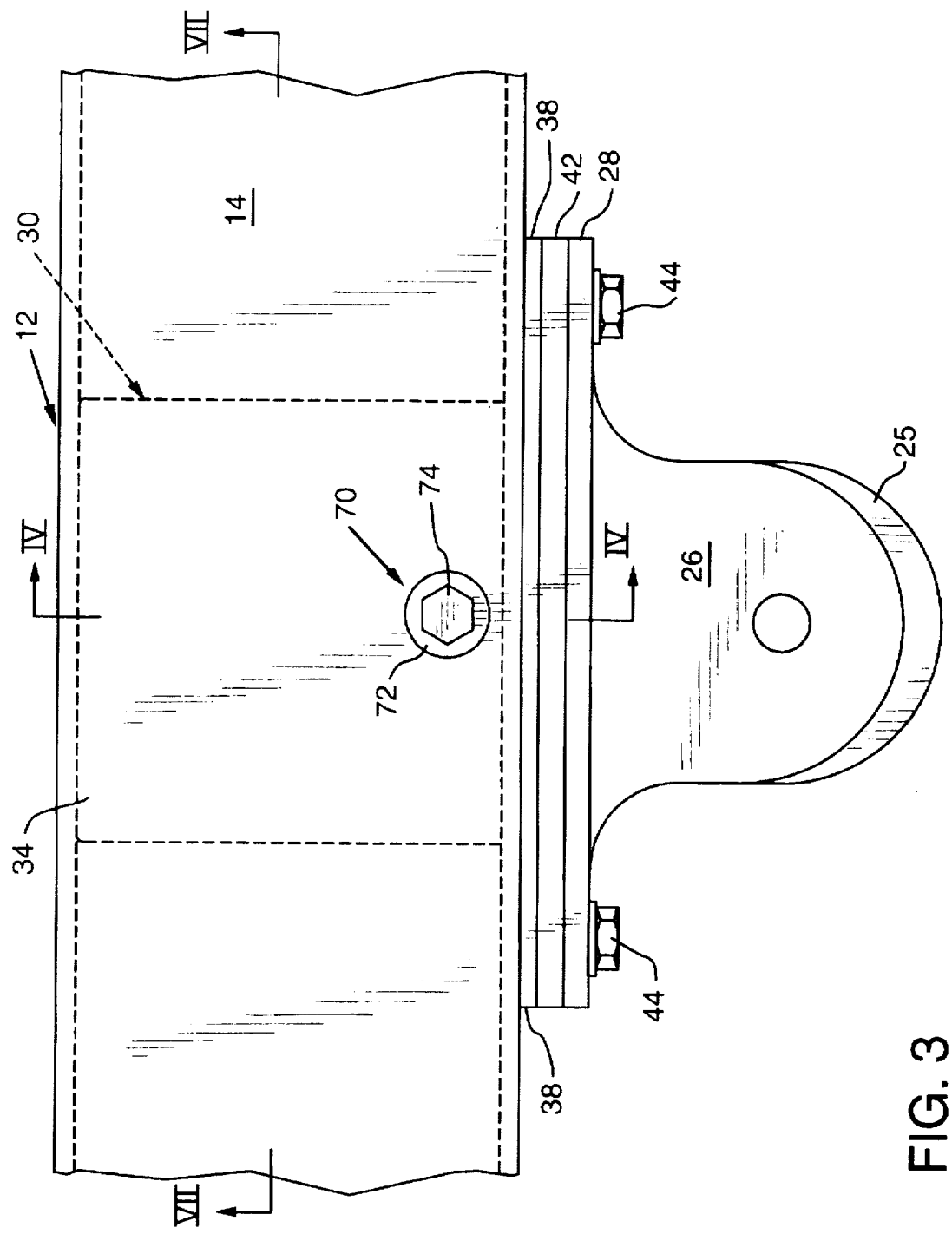
FIG. 3 is an enlarged side elevational view of a preferred suspension apparatus of the present invention attached to the frame of the mobile vehicle of FIGS. 1 and 2.

As can be seen in FIGS. 1 and 2, the vehicle 10 includes a frame member 12 that is preferably fabricated from rectangular-shaped steel side members 14 that are hollow. The vehicle 10 also includes a drive unit 16 that is rotatably supported the frame 12 for accommodating a driver and supplying power to the vehicle 10. A boom assembly 17 is attached to the drive unit and operably supports a vegetation cutting assembly 18. The preferred construction and operation of those components can be gleaned from the above-mentioned patent application.

The frame 12 is mounted on front and rear wheel assemblies. In this embodiment, rear wheel assembly 20 includes a driven axle unit that connects the rear wheel units 22. The front wheel units 24 are preferably free wheeling and comprise a wheel 25 adapted for travel on a railroad track that is supported in a commercially available bearing unit 26 that is equipped with an attachment plate 28.

As can be seen from FIGS. 3–7, a preferred suspension apparatus 30 comprises a housing member 32 that is preferably square in cross-section and has an enclosed end 34 and an open end 36. The housing member 32 is sized to be substantially received within a hollow side member 14 of the frame 12. The housing member 32 is preferably retained within the side member 14 and attached thereto by a pair of attachment tabs 38 that are attached to opposing side walls 35 of the housing member 32 adjacent the open end 36. See FIG. 6. Attachment tabs 38 are preferably attached to the opposing walls 35 of the housing member 32 and the side member 14 by welding to affix the housing member 32 within the side member 14. When attached to the side member 14, the housing member 32 defines an extension axis A-A. See FIGS. 4–6.

A preferred suspension apparatus 30 also includes a wheel unit support assembly 40 that has an attachment plate 42 for mating engagement and attachment to the attachment plate 28 of a corresponding wheel supporting bearing unit 26. In a preferred embodiment, the attachment plate 28 of the bearing unit 26 is removably attached to the attachment plate 42 of the wheel unit support assembly by bolts 44. The support assembly 40 also preferably includes an upwardly extending hollow extension portion 50 that is attached to is the attachment plate 42 preferably by welding. Extension portion 50 is also preferably square-shaped in cross-section and is sized relative to the housing member 32 to be telescopingly received therein such that a lubrication channel 52, having a preferred width of approximately 0.25" (represented by dimension "B" in FIGS. 5 and 6), is defined therebetween; other sizes of lubrication channels can also be successfully employed. The skilled artisan will appreciate that the lubrication channel 52 is adapted to receive a commercially available lubricating medium such as bearing grease to reduce the friction between the extension member So and the housing member 32. Also, to facilitate easier insertion of the hollow extension member 50 into the open end 36 of the housing member 32, the end of the extension member 50 that is received in the housing member 32 is preferably provided with tapered portions 56. The reader will appreciate from the foregoing description that the hollow extension portion So is adapted to telescopingly slide within the housing member 32 along axis A—A. This telescoping movement is represented by the double-headed arrow "C" in FIG. 6.

As noted above, the preferred cross-sectional shapes of the housing member 32 and the extension portion 50 are square. Such square-shaped components serve to successfully prevent the hollow extension portion 50 from substantially canting or twisting within the housing member. The skilled artisan will also appreciate, however, that the housing member 32 and extension portion 50 could be provided in other complimentary shapes such that the extension member is rigidly supported relative to the housing as the support assembly axially moves with respect to the housing member 32.

In a preferred embodiment, the suspension apparatus includes a biasing member, preferably a coilspring 60. The skilled artisan will appreciate that the size of the coil spring will be dependent upon the type and weight of the vehicle with which the suspension apparatus is employed. For example, for the type of vegetation cutting vehicle 10 disclosed herein, a coilspring that can generate at least 7000 pounds of spring force has been successfully used. Also in a preferred embodiment, spring registration members (62, 64) are employed to maintain the coilspring 60 in axial alignment on axis A—A. As can be seen in FIGS. 3–6, spring registration member 62 preferably comprises a cylindrical member that is attached to end 34 of housing member 30, preferably by welding. Similarly, spring registration member 64 preferably comprises a cylindrical member that is welded to the attachment plate 42.

Figure 4:
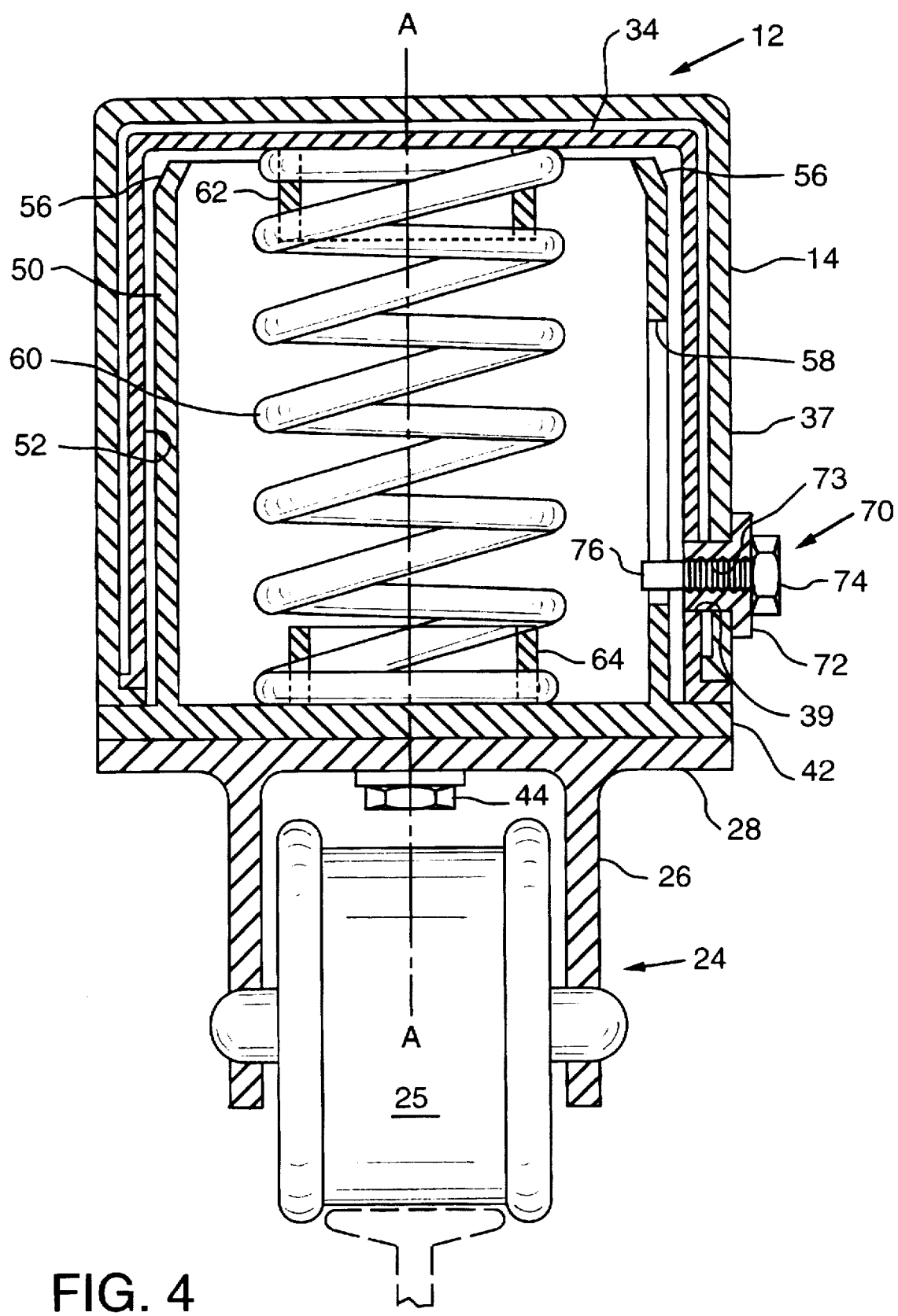
FIG. 4 is a cross-sectional view of the suspension apparatus in a fully compressed position taken along line IV—IV in FIG. 3 with some of the components thereof shown in full view.
Figure 5:
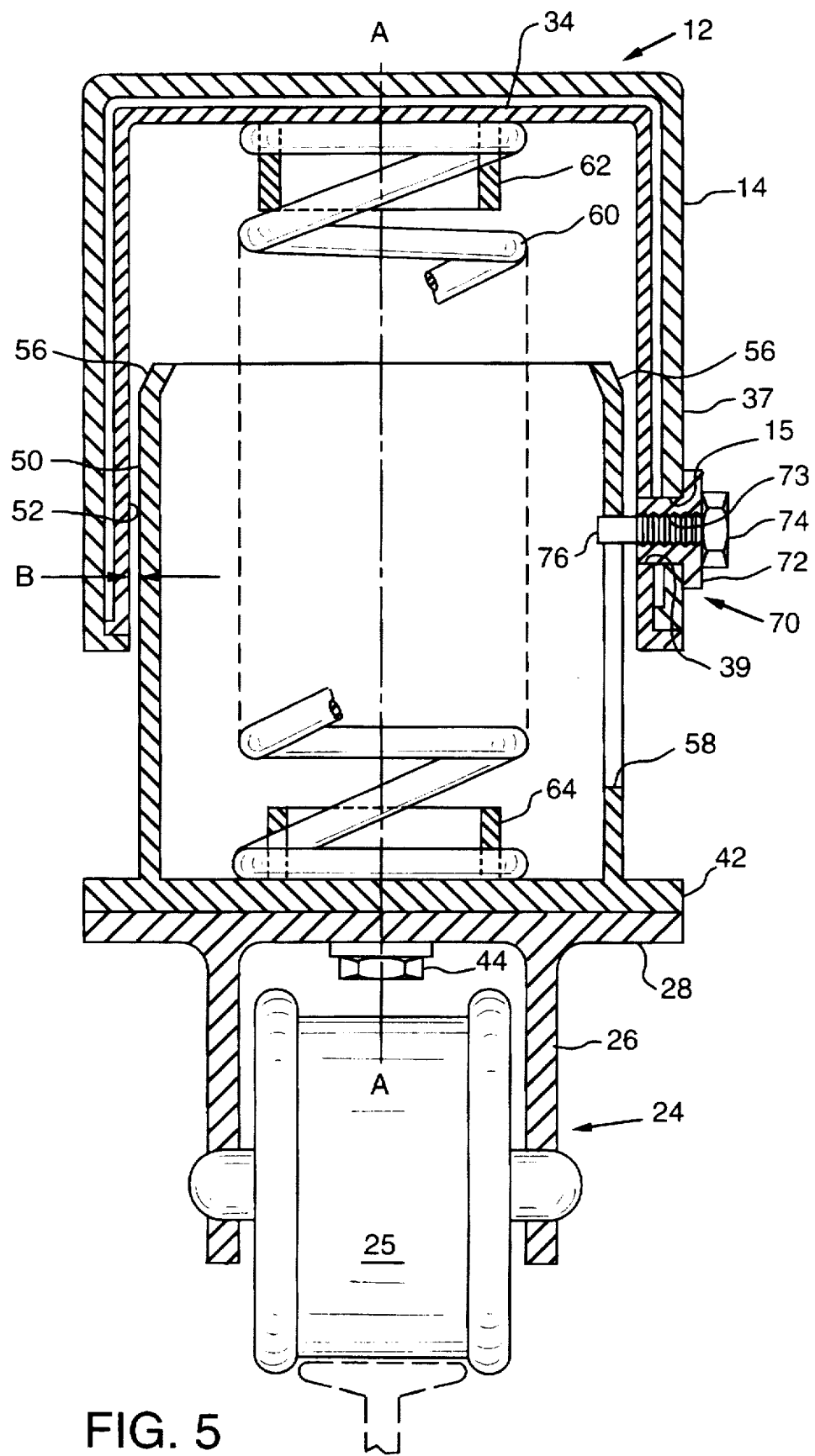
FIG. 5 is a cross-sectional view of the suspension apparatus of FIG. 4 in an extended position.
Figure 6:
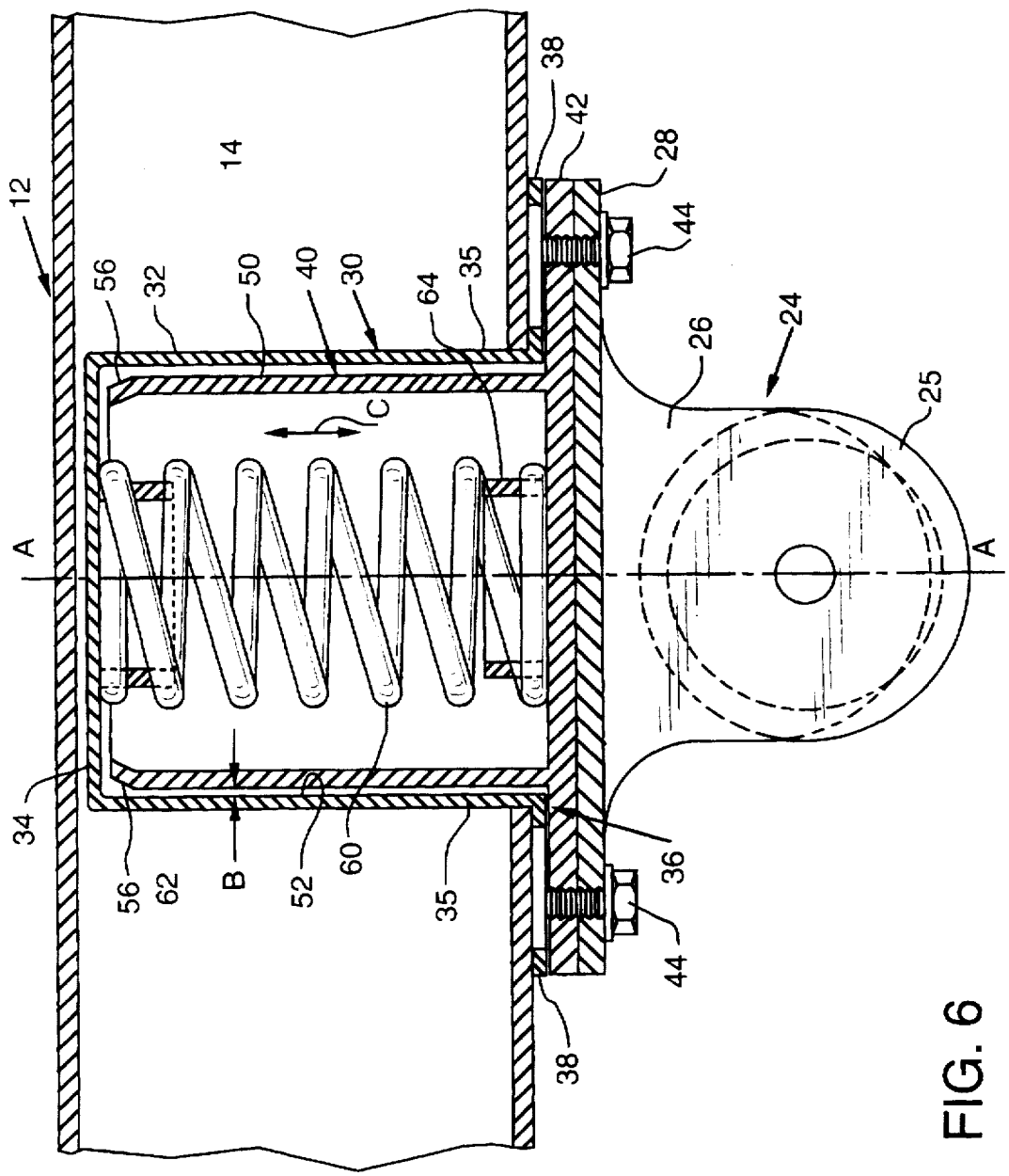
FIG. 6 is a lateral cross-sectional elevational view of the suspension apparatus depicted in FIG. 4.
Figure 7:
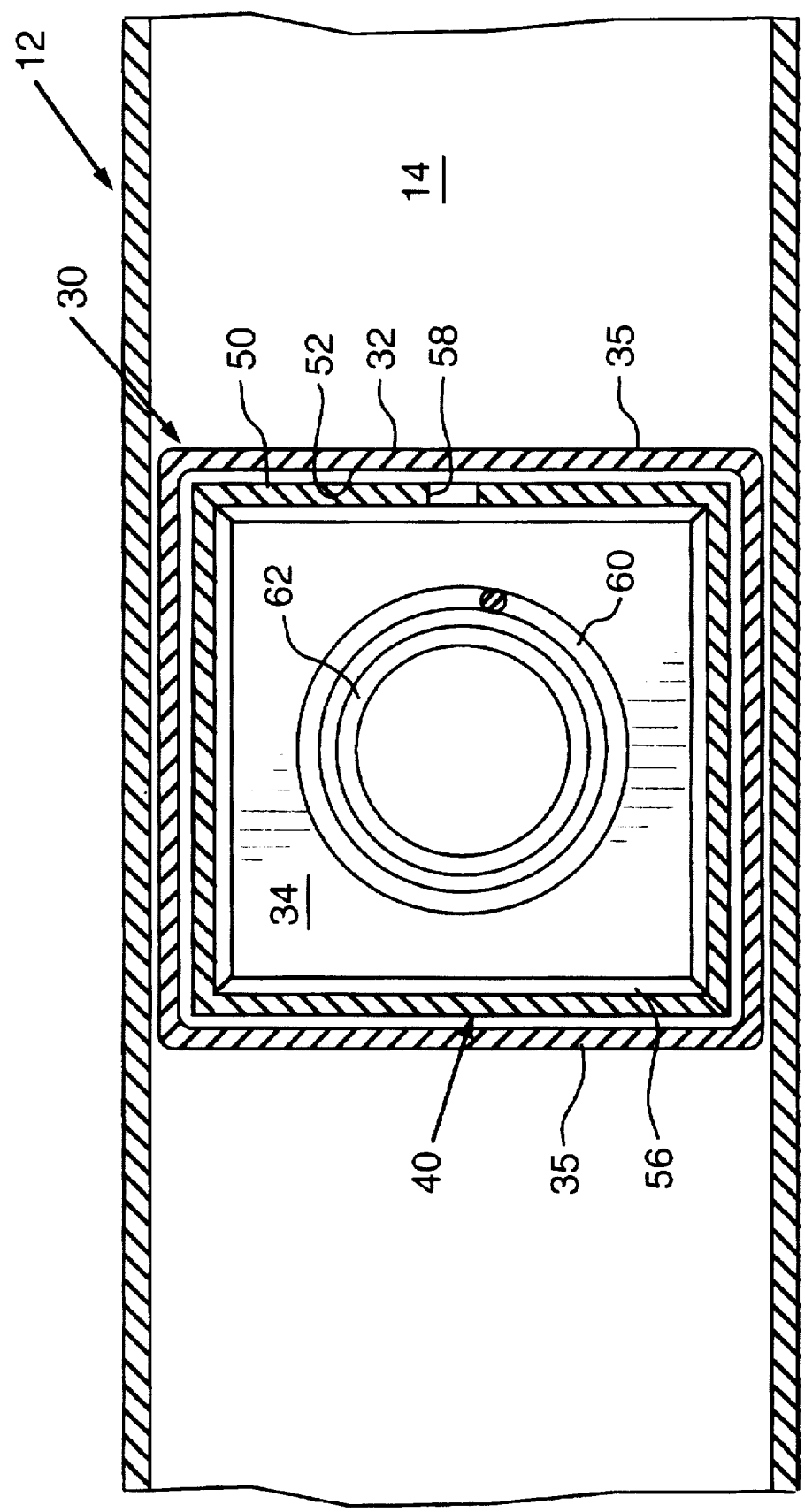
FIG. 7 is a sectional view of the suspension apparatus of FIG. 3 taken along line VII—VII in FIG. 3.

A preferred embodiment of the present invention is also equipped with a travel limiting assembly 70. As can be seen in FIG. 4, assembly 70 preferably includes a threaded bushing 72 that extends through coaxially aligned bores (15, 39) that are provided in side member 14 of frame 12 and the side wall 37 of the housing member 32, respectively. Preferably, bushing 70 is attached to the side member 14 by welding and has a threaded bore 73 extending therethrough adapted to receive a threaded pin 74 therein. When threaded into the threaded bore 73 in bushing 70, an end 76 of pin 74 extends into an axially extending slot 58 provided in a corresponding wall of extension portion 50. The skilled artisan will appreciate that pin 74, in cooperation with the slot 58, limits the axial travel of the wheel unit support assembly 40 relative to the housing member 32 and frame 12 to a predetermined amount that is defined by the length of slot 58. For example, FIG. 5 shows the wheel unit support assembly 40 in a maximum extended position. Preferably the slot 58 and pin member 74 are arranged to prevent the hollow extension portion 50 from being biased completely out of the housing member 32 should the vehicle 10 move away from the rails a distance that is greater than the axial length of the extended portion.

Preferably, a suspension apparatus of the type described above is employed with each of the front wheel units 24 of the vehicle 10. When the vehicle encounters a switch or an irregularity in the rails which causes the vehicle to cant about is longitudinal axis (represented as axis G—G in FIG. 1), the suspension apparatus 30 on the wheel unit 24 located on the side of the frame 12 that is titled away from the rails biases the wheel 25 onto the rail (for example as shown in FIG. 5) until the vehicle 10 returns to its normal position on the rails (as shown in FIG. 4). Thus, when the vehicle 10 is canted away from a rail, the suspension apparatus 30 causes the wheel unit 24 on the titled side to "chase" its rail and remain in contact therewith.

Accordingly, the present invention provides solutions to the aforementioned problems associated with track-mounted vehicles such as those vehicles adapted to cut vegetation along railroad right of ways. It will be understood, however, that various changes in the details, materials and arrangement of parts which have been herein described and illustrated in order to explain the nature of the invention may be made by those skilled in the art within the principle and scope of the invention as expressed in the appended claims.

What is claimed is:

1. Suspension apparatus for a mobile vehicle having a frame and a plurality of wheel units adapted to travel on rails, the apparatus comprising:

a housing member corresponding to a wheel unit and being rigidly attached to said frame of said mobile vehicle, said housing member having an enclosed end and a downwardly-extending open end and defining an extension axis;

a wheel unit support assembly having a first attachment plate for attachment to a wheel unit and an upwardly extending hollow extension portion attached to said first attachment plate and being sized to telescopingly extend into said housing member along said extension axis;

a biasing member for biasing said first attachment plate away from said frame, said biasing member being received in said hollow extension portion and extending between said enclosed end of said housing member and said first attachment plate; and travel limiting means accessible from an exterior portion of said frame and cooperating with said hollow extension portion to selectively limit the axial telescopic travel of said hollow extension portion relative to said housing member to a predetermined range of axial travel, said travel limiting means including an axially extending slot in said hollow extension portion of said wheel unit support assembly, a threaded bushing attached to said frame and said housing member and defining a threaded passageway through said frame and housing member, and a threaded pin member threadedly received in said threaded bushing, said pin member having an end adapted to be selectively received within said slot in said hollow extension portion to limit the axial travel thereof relative to the housing member.

2. The suspension apparatus of claim 1 wherein said hollow extension portion of said wheel unit support assembly is sized relative to said housing member to define a lubrication channel therebetween for receiving a lubricating medium therein.

3. The suspension apparatus of claim 1 wherein said biasing member comprises a coilspring.

4. The suspension apparatus of claim 3 further comprising at least one spring registration member attached to said enclosed end of said housing member and said first attachment plate for coaxially aligning said coilspring along said extension axis.

5. The suspension apparatus of claim 1 wherein said frame includes hollow side members and wherein said housing member is complementary sized and shaped to be substantially received within a corresponding said hollow side member.

6. The suspension apparatus of claim 5 wherein said housing member comprises a substantially square-shaped enclosure sized to be substantially received within said hollow side member, said square-shaped enclosure having an open end for telescopingly receiving said hollow-extension portion of said wheel unit support assembly therein and having attachment tabs for attaching said housing member to side member.

7. The suspension apparatus of claim 6 wherein said wheel unit includes a second attachment plate adapted for attachment to said first attachment plate by a plurality of fasteners and wherein said suspension apparatus further comprises cavities in said attachment tabs for providing clearance for said fasteners.

8. The suspension apparatus of claim 1 wherein said upwardly extended hollow extension portion has a tapered end.

9. A mobile vegetation cutting apparatus comprising:
a frame;
a drive unit operably mounted on said frame;
two driven wheel units attached to said frame;
two secondary wheel units attached to said frame, each said secondary wheel units being attached to said frame by a corresponding suspension apparatus comprising a housing member rigidly attached to said frame and having an enclosed end and a downwardly-extending open end and defining an extension axis and a wheel unit support assembly having a first attachment plate for attachment to said secondary wheel unit and an upwardly extending hollow extension portion attached to said first attachment plate and being sized to telescopingly extend into said housing member along said extension axis, said suspension apparatus further comprising a biasing member for biasing said first attachment plate away from said frame, said biasing member being received in said hollow extension portion and extending between said enclosed end of said housing member and said first attachment plate and travel limiting means accessible from an exterior portion of said frame and cooperating with said hollow extension portion to selectively limit the axial telescopic travel of said hollow extension portion relative to said housing member to a predetermined range of axial travel wherein said travel limiting means includes an axially extending slot in said hollow extension portion of said wheel unit support assembly, a threaded bushing attached to said frame and said housing member and defining a threaded passageway through said frame and housing member, and a threaded pin member threadedly received in said threaded bushings, said pin member having an end adapted to be selectively received within said slot in said hollow extension portion to limit the axial travel thereof relative to the housing member.

10. The suspension apparatus of claim 9 wherein said hollow extension portion of each said wheel unit support assembly is sized relative to said corresponding housing member to define a lubrication channel therebetween for receiving a lubricating medium therein.

11. The suspension apparatus of claim 9 wherein each said biasing member comprises a coilspring.

12. The suspension apparatus of claim 11 further comprising at least one spring registration member attached to said enclosed end of each said housing member and said corresponding first attachment plate for coaxially aligning said corresponding coilspring along said corresponding extension axis.

13. Suspension apparatus for a mobile vehicle having a frame and a plurality of wheel units adapted to travel on rails, the apparatus comprising:

a housing member corresponding to a wheel unit and being rigidly attached to said frame of said mobile vehicle, said housing member having an enclosed end and a downwardly-extending open end and defining an extension axis and wherein said frame includes hollow side members and said housing member is complementary sized and shaped to be substantially received within a corresponding hollow side member;

a wheel unit support assembly having a first attachment plate for attachment to a wheel unit and an upwardly extending hollow extension portion attached to said first attachment plate and being sized to telescopingly extend into said housing member along said extension axis;

a biasing member for biasing said first attachment plate away from said frame, said biasing member being received in said hollow extension portion and extending between said enclosed end of said housing member and said first attachment plate; and travel limiting means accessible from an exterior portion of said frame and cooperating with said hollow extension portion to selectively limit the axial telescopic travel of said hollow extension portion relative to said housing member to a predetermined range of axial travel.

14. The suspension apparatus of claim 13 wherein said hollow extension portion of said wheel unit support assembly is sized relative to said housing member to define a lubrication channel therebetween for receiving a lubricating medium therein.

15. The suspension apparatus of claim 13 wherein said biasing member comprises a coilspring.

16. The suspension apparatus of claim 15 further comprising at least one spring registration member attached to said enclosed end of said housing member and said first attachment plate for coaxially aligning said coilspring along said extension axis.

17. The suspension apparatus of claim 13 wherein said travel limiting means comprises:

an axially extending slot in said hollow extension portion of said wheel unit support assembly;

a threaded bushing attached to said frame and said housing member and defining a threaded passageway through said frame and housing member; and a threaded pin member threadedly received in said threaded bushing, said pin member having an end adapted to be selectively received within said slot in said hollow extension portion to limit the axial travel thereof to the housing member.

18. The suspension apparatus of claim 13 wherein said housing member comprises a substantially square-shaped enclosure sized to be substantially received within said hollow side member, said square-shaped enclosure having an open end for telescopingly receiving said hollow-extension portion of said wheel unit support assembly therein and having attachment tabs for attaching said housing member to side member.

19. The suspension apparatus of claim 18 wherein said wheel unit includes a second attachment plate adapted for attachment to said first attachment plate by a plurality of fasteners and wherein said suspension apparatus further comprises cavities in said attachment tabs for providing clearance for said fasteners.

20. The suspension apparatus of claim 13 wherein said upwardly extended hollow extension portion has a tapered end.

* * * * *

UNITED STATES PATENT AND TRADEMARK OFFICE
CERTIFICATE OF CORRECTION

PATENT NO. : 5,893,330
DATED : April 13, 1999
INVENTOR(S) : Benjamin H. Emery

Page 1 of 1

It is certified that error appears in the above-identified patent and that said Letters Patent is hereby corrected as shown below:

Column 3,
Line 45, delete "So" and replace therewith -- 50 --
Line 51, delete "So" and replace therewith -- 50 --

Signed and Sealed this

Twenty-fourth Day of September, 2002

Attest:

JAMES E. ROGAN
Attesting Officer    Director of the United States Patent and Trademark Office